United States Patent
Siira et al.

(10) Patent No.: US 8,688,770 B2
(45) Date of Patent: Apr. 1, 2014

(54) SYSTEM AND METHOD FOR JOB MANAGEMENT BETWEEN MOBILE DEVICES

(75) Inventors: Juhani Siira, Burnaby (CA); Haiping Lian, Coquitlam (CA)

(73) Assignee: Webtech Wireless Inc., Burnaby (CA)

( * ) Notice: Subject to any disclaimer, the term of this patent is extended or adjusted under 35 U.S.C. 154(b) by 171 days.

(21) Appl. No.: 13/076,217

(22) Filed: Mar. 30, 2011

(65) Prior Publication Data

US 2012/0254874 A1 Oct. 4, 2012

(51) Int. Cl.
*G06F 15/16* (2006.01)

(52) U.S. Cl.
USPC .......................... 709/202; 709/203

(58) Field of Classification Search
USPC ................................ 709/202, 203
See application file for complete search history.

(56) References Cited

U.S. PATENT DOCUMENTS

| | | | |
|---|---|---|---|
| 6,484,036 B1 * | 11/2002 | Sorkin et al. ................ | 455/508 |
| 7,538,667 B2 | 5/2009 | Koen | |
| 7,624,024 B2 * | 11/2009 | Levis et al. .................. | 705/1.1 |
| 2002/0087548 A1 | 7/2002 | Tasalloti | |

FOREIGN PATENT DOCUMENTS

CA 2297708 7/2001

* cited by examiner

*Primary Examiner* — Adnan Mirza
(74) *Attorney, Agent, or Firm* — John Flanagan (57) ABSTRACT

A system for job management between mobile devices includes a processor configured to store in a storage messages and data pertaining to job assignments and reassignments to build a historical record concerning each job assignment and reassignment, to receive from a dispatch terminal requests containing messages and data pertaining to creating and allocating job assignments and reassignments at and between mobile devices, to communicate via a communication interface with the mobile devices, to execute the requests by creating and allocating the job assignments and reassignments at and between the mobile devices, and to output to a storage the messages and data pertaining to the allocation of job assignments and reassignments in order to add to and maintain the historical record in the storage concerning each job assignment and reassignment with respect to the mobile devices.

16 Claims, 10 Drawing Sheets

☐ Create Job

Name ____________

By Address | By Landmark | From Map

Address __________ City __________

State/Province __________ Zip/Postal __________

Country [ Canada ▽ ]

[ Check Location ]  [ No Address Selected ▽ ]

Description [____________◁ ▷]

Assign [ By Vehicle ▽ ] [ No Vehicle Selected ▽ ]

[ Add Job ] [ Clear ]

*Fig. 3*

☐ Create Job

Name ☐

| By Address | By Landmark | From Map |

← ↑ → + −
↓

Map | Satellite | Hybrid (MAP OF LOCATIONS)

Description

[ < > ]

Assign

By Vehicle ▽    No Vehicle Selected ▽

Add Job    Clear

☐ View Jobs

Job Filter

Assigned To: [Vehicle ▽] [    ]   Date Filter: [---- ▽]   Job Status: [---- ◁▷]
Job Ref No.: [    ]   Job Name: [    ]   [Assigned / Submitted / Received]   [Filter] [Clear]

| Ref No. | Name | Description | Status | Vehicle | Driver | Mobile ID | ETA | Destination | ETA |
|---------|------|-------------|--------|---------|--------|-----------|-----|-------------|-----|
|         |      |             |        |         |        |           |     |             |     |

▽ Job History: [(Ref No.   )]

| Status | Stop Status | Vehicle | Driver | Mobile ID | ETA | ETA Dl... | Reason | Date Modified | Whom |
|--------|-------------|---------|--------|-----------|-----|-----------|--------|---------------|------|
|        |             |         |        |           |     |           |        |               |      |

☐ Manage Jobs

| Vehicle | Garmin_Locator ˅ | Refresh | | | | Sync to Mobile | Read from Mobile | |
|---|---|---|---|---|---|---|---|---|
| Action | Ref No. | Name | Description | Status | Vehicle | Driver | Mobile ID | Destination | ETA |

SYSTEM AND METHOD FOR JOB MANAGEMENT BETWEEN MOBILE DEVICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter of the present invention is directed generally to job management with respect to fleet vehicles and, more particularly, is concerned with a system and method for job management between mobile devices of fleet vehicles.

BACKGROUND ART

Job management performed through wireless communication with regard to service personnel of fleet vehicles frequently finds it desirable to reassign jobs between such service personnel. One prior art job management system that allows rescheduling of a job is disclosed in U.S. Pat. No. 6,484,036.

Fleet vehicles are typically equipped with mobile devices to facilitate job management. An example of one such mobile device is disclosed in U.S. Pat. No. 7,538,667 assigned to WebTech Wireless Inc., of Burnaby, British Columbia, Canada.

Unlike in a typical personnel oriented job management system, in a wireless communication oriented job management system once a job is assigned to a mobile device in a given fleet vehicle, the job will be retained on such mobile device until it is deleted by the dispatcher or the service person using the vehicle. As such, reassignment of a job between service personnel of different fleet vehicles will entail the deletion of the job from the given fleet vehicle and the addition of the job to a new fleet vehicle. This can be done manually by deleting the job from the mobile device of the service person in the given vehicle and then creating a new job with the same profile in the mobile device of the service person in the new fleet vehicle. However, the history of the job would ordinarily be lost in carrying out this process.

An efficient yet reliable way to manage real-time job reassignment between different fleet vehicles is challenging. A need thus exists for an innovation which will meet this challenge.

SUMMARY OF THE INVENTION

The subject matter of the present invention is directed to an innovation that involves a system and method for job management between mobile devices, namely the allocation of job assignments and reassignments between service personnel of different fleet vehicles equipped with mobile devices. Previously assigned jobs are allowed to be dynamically reassigned from the mobile device of a service person of one vehicle to that of another without lost of the job history. This will enable real-time maintenance of workforce load balance (so that no worker is idle) and allow high-priority jobs which are in jeopardy for non-completion to be reassigned to personnel with lower priority jobs, thus ensuring the completion of high priority jobs.

Accordingly, in one aspect of the present invention, a system for job management between mobile devices includes a processor, a plurality of mobile devices, a storage coupled to the processor and storing messages and data pertaining to job assignments and reassignments at and between the mobile devices, a communication interface coupled to the processor and enabling communication between the processor and the mobile devices, and a dispatch terminal coupled to the processor and adapted to send requests to the processor containing messages and data pertaining to creating and allocating job assignments and reassignments at and between the mobile devices. The processor is configured to store in the storage messages and data pertaining to job assignments and reassignments at and between the mobile devices to build a historical record concerning each job assignment and reassignment with respect to the mobile devices, receive the requests from the dispatch terminal, communicate via the communication interface with the mobile devices, execute the requests by creating and allocating the job assignments and reassignments at and between the mobile devices, and output to the storage the messages and data pertaining to the allocation of job assignments and reassignments to add to and maintain the historical record in the storage concerning each job assignment and reassignment with respect to the mobile devices.

In another aspect of the present invention, a method for job management between mobile devices includes the steps of storing in a storage messages and data pertaining to job assignments and reassignments at and between mobile devices to build a historical record concerning each job assignment and reassignment with respect to the mobile devices, sending by a dispatch terminal to a processor requests containing messages and data pertaining to creating and allocating job assignments and reassignments at and between mobile devices, receiving by the processor the requests, communicating via a communication interface the processor with the mobile devices, executing the requests by the processor creating and allocating the job assignments and reassignments at and between the mobile devices, and outputting by the processor to the storage the messages and data pertaining to the allocation of job assignments and reassignments to add to and maintain the historical record in the storage concerning each job assignment and reassignment with respect to the mobile devices.

BRIEF DESCRIPTION OF THE DRAWINGS

For clarity, the drawings herein are not necessarily to scale, and have been provided as such in order to illustrate the principles of the subject matter, not to limit the invention.

DESCRIPTION OF EMBODIMENTS

Figure 1:
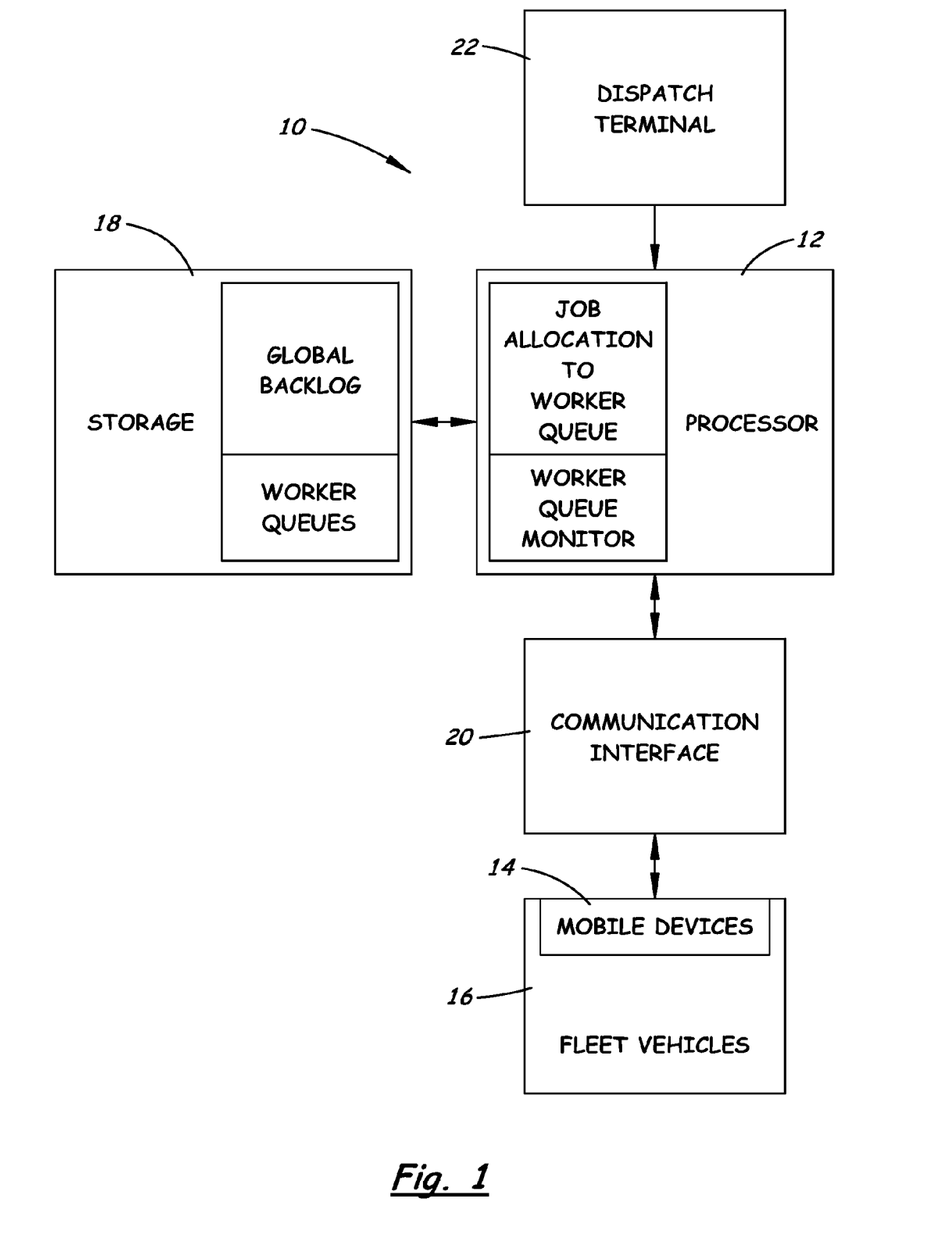
FIG. 1 is a diagram of an exemplary embodiment of a system for job management between mobile devices in accordance with the present invention.
Figure 2:
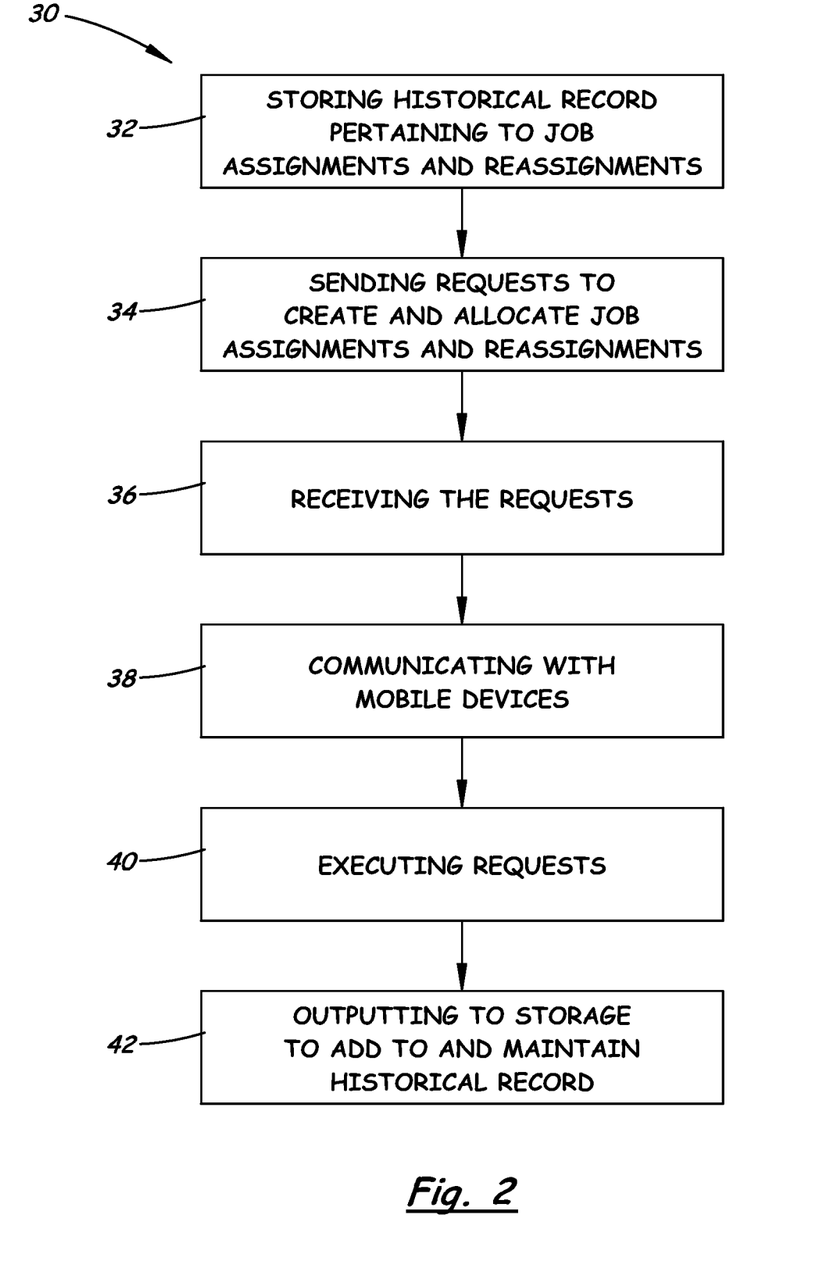
FIG. 2 is a diagram of an exemplary embodiment of the steps of a method for job management between mobile devices in accordance with the present invention.

Referring now to FIGS. 1 and 2, diagrams are presented of exemplary embodiments of a system and method for job management between mobile devices in accordance with the present invention. As shown in FIG. 1, the job management system, generally designated 10, employs a processor 12, a plurality of mobile devices 16 placed in fleet vehicles 16, a storage 18, a communication interface 20, and a dispatch terminal 22. These may take the form of any of a number of commercially-available components individually well-known to those skilled in the art.

More particularly, the storage 18 is coupled to the processor 12 for storing messages and data pertaining to job allocations, such as job assignments and reassignments, at and between the mobile devices 14. The communication interface 20 is coupled to the processor 12 for providing a desired kind of communication, such as for example wireless communication, between the processor 12 and the mobile devices 14. The dispatch terminal 22 is coupled to the processor 12 and adapted to send requests to the processor 12 containing messages and data pertaining to creating and allocating job assignments and reassignments at and between the mobile devices 14.

The processor 12 is configured, by employment of programming techniques well-known to those skilled in the art, to carry out the job management method according to the diagram, generally designated 30, in FIG. 2. As per step 32, the processor 12 stores in the storage 18 messages and data pertaining to job assignments and reassignments at and between the mobile devices 14 to build a historical record in the storage 18 concerning each job assignment and reassignment with respect to the mobile devices 14. As per step 34, the dispatch terminal 22 sends to the processor 12 requests containing messages and data pertaining to creating and allocating job assignments and reassignments at and between the mobile devices 14. As per step 36, the processor 12 receives from the dispatch terminal 22 the requests. As per step 38, the processor 12 via the communication interface 20 communicates with the mobile devices 14. As per step 40, the processor 12 executes the requests by creating and allocating the job assignments and reassignments at and between the mobile devices 14. As per step 42, the processor 12 outputs to the storage 18 the messages and data pertaining to the allocation of job assignments and reassignments to add to and maintain the historical record in the storage 18 concerning each job assignment and reassignment with respect to the mobile devices 14.

Figure 3:
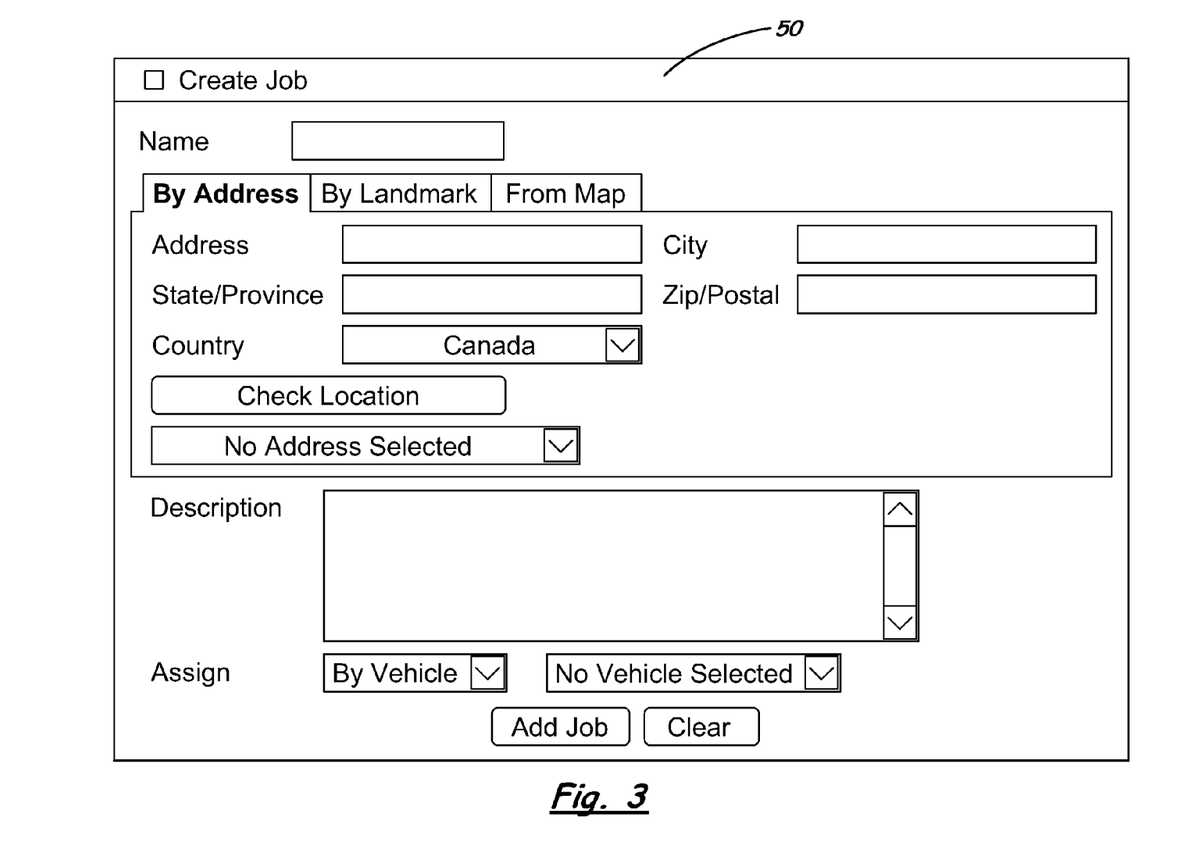
FIGS. 3-8 depict in foreshortened, abbreviated, form monitor display program windows used by a dispatcher to carry out steps of the job management system and method.
Figure 4:
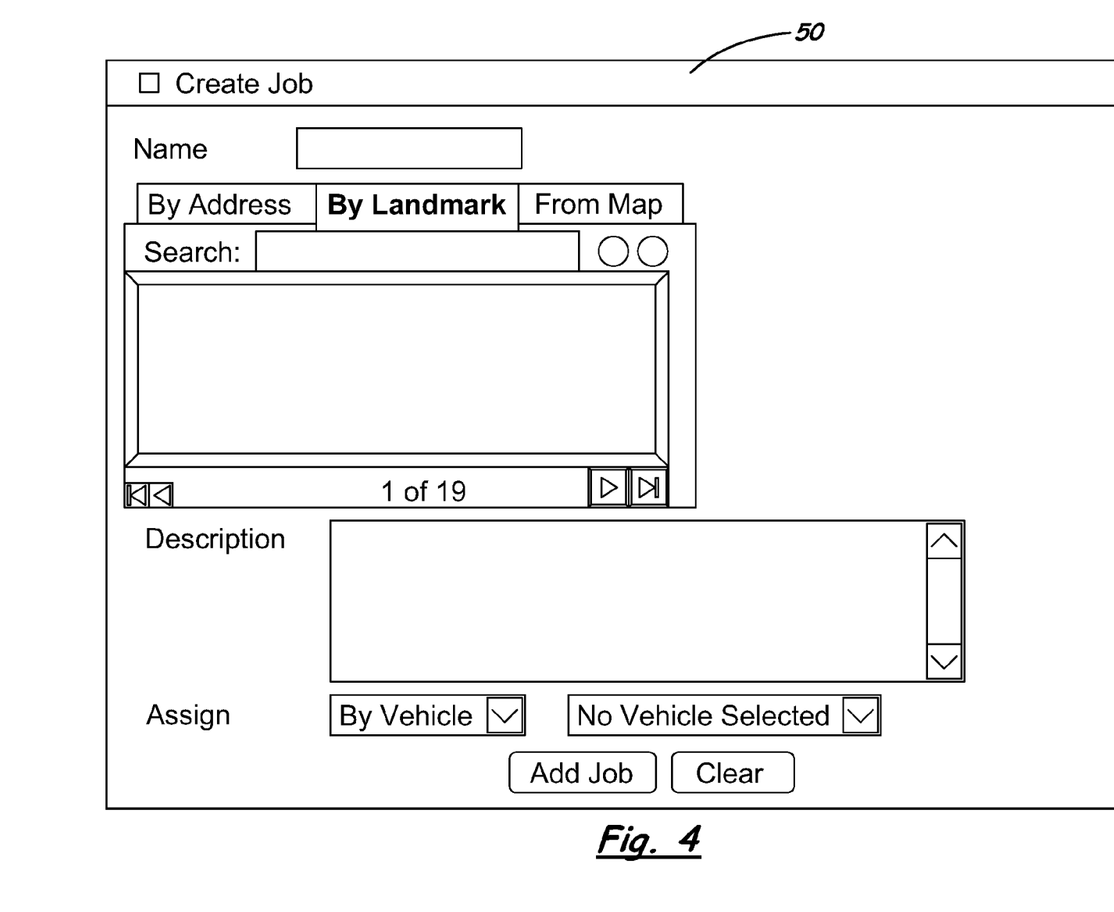
Figure 5:
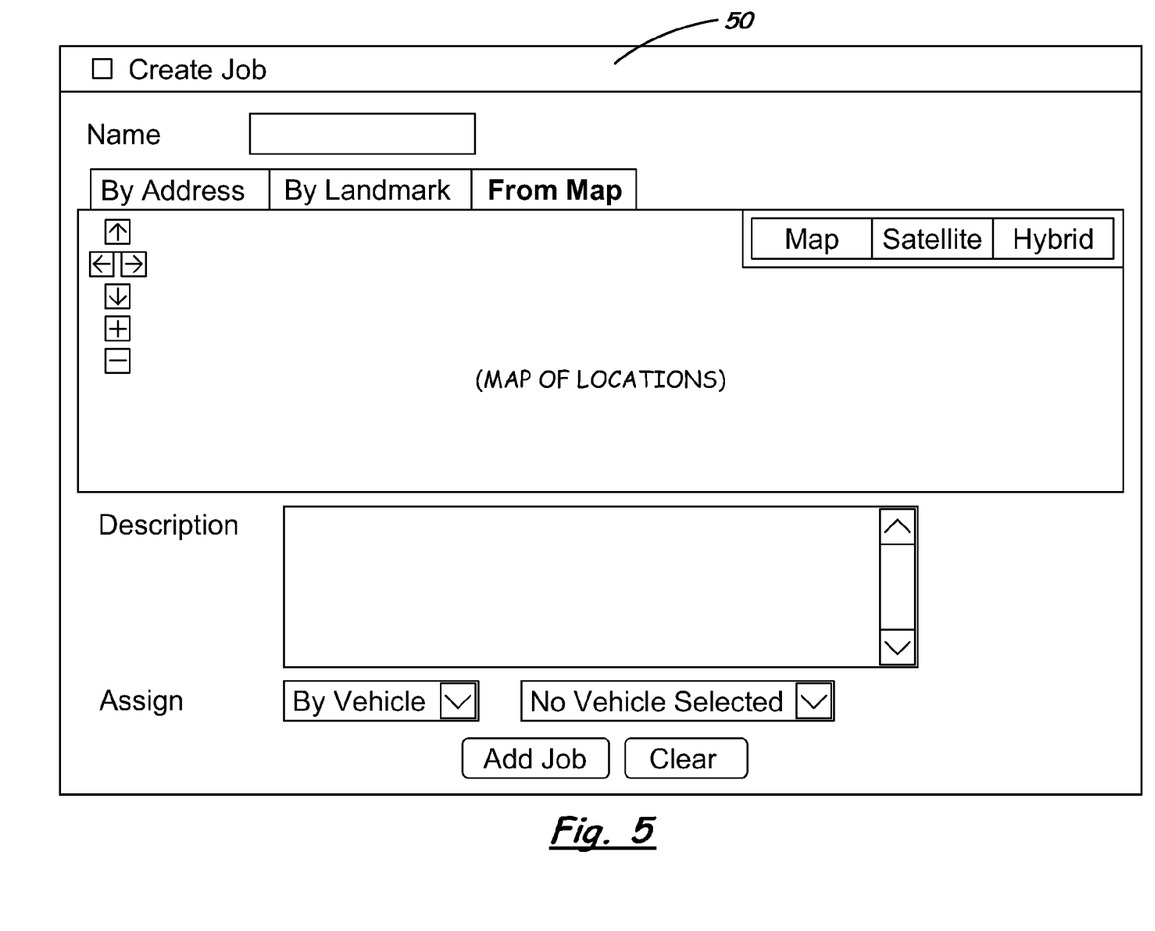
Figure 6:
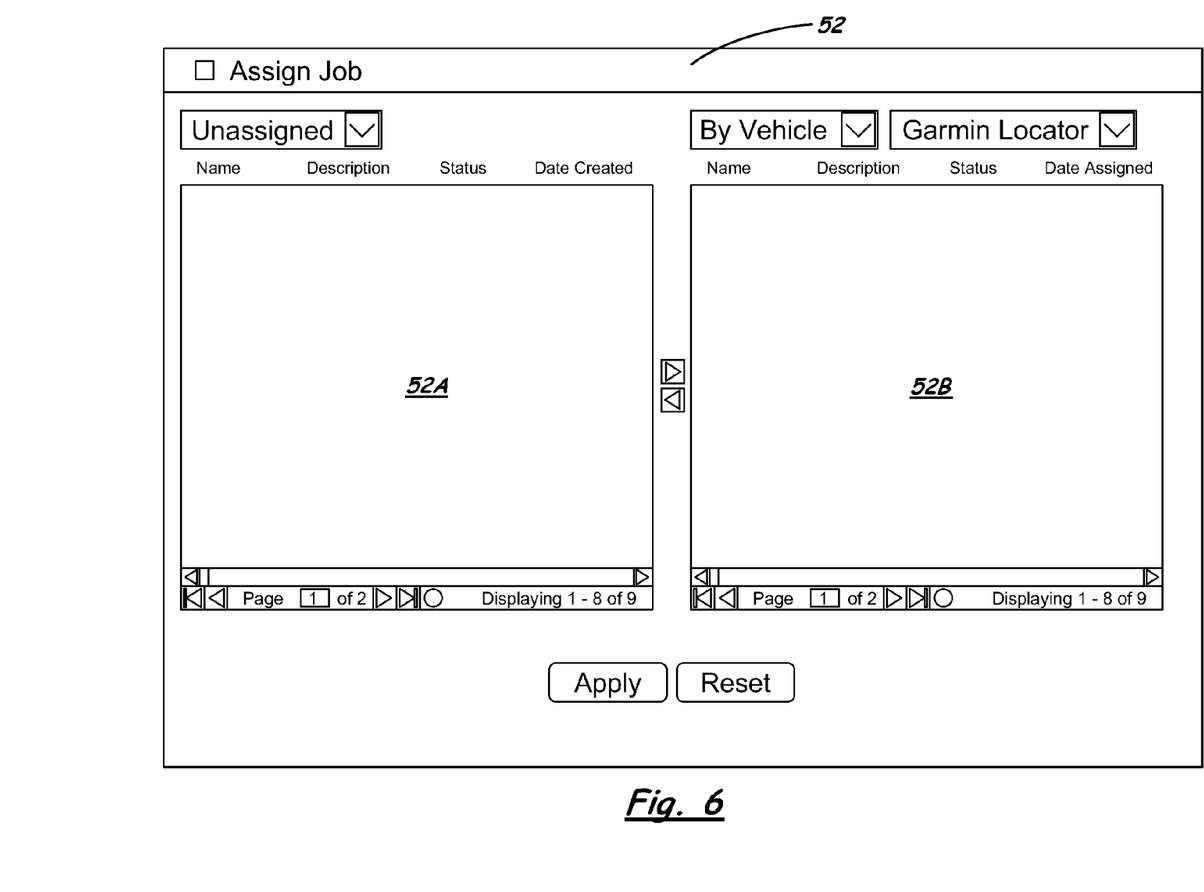
Figure 7:
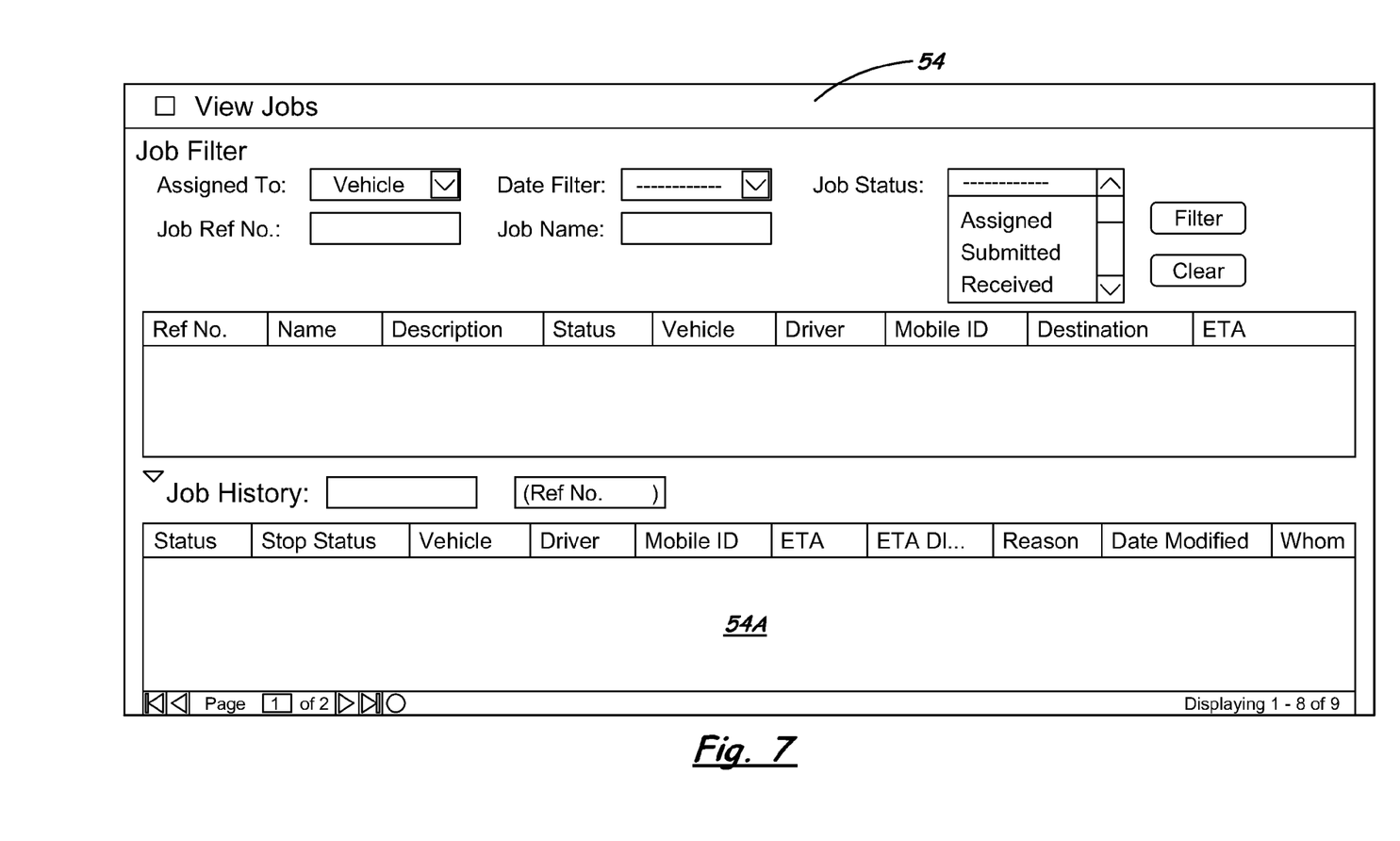
Figure 8:
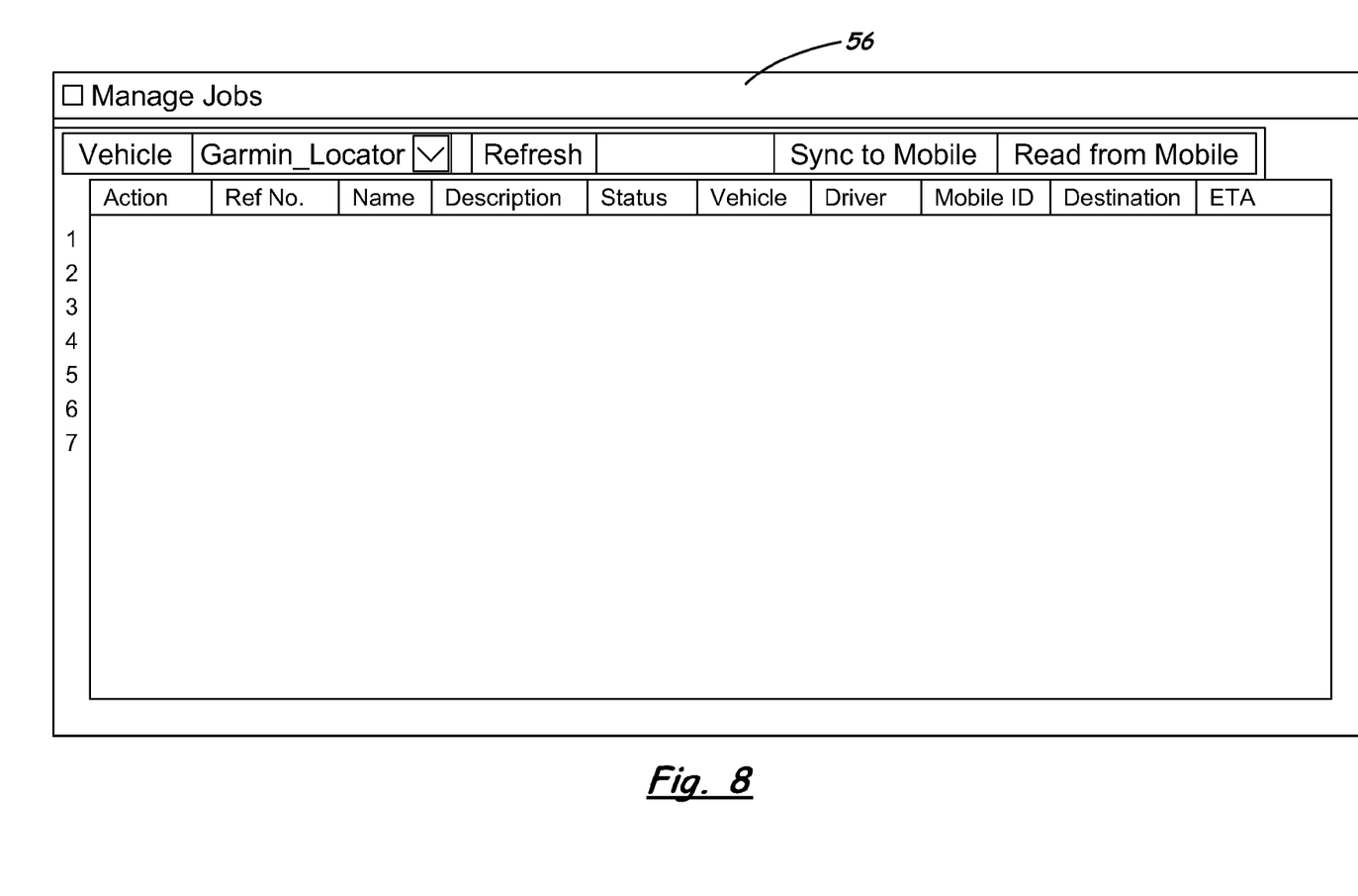

Referring now to FIGS. 3-8, there is depicted an exemplary embodiment of various job management system windows (being shown in foreshortened, or abbreviated, form omitting, for purposes of simplification and clarity, detailed columns or lists of data under the various headings) that may be created and displayed on the dispatch terminal 22 by the processor 12. The windows are used by a dispatcher to create and send job details to selected mobile devices 14 of the fleet vehicles 16. There are four main job management system windows. They are: (1) a Create Job window 50 as depicted in FIGS. 3-5; (2) an Assign Job window 52 as depicted in FIG. 6; (3) a View Jobs window 54 as depicted in FIGS. 7; and (4) a Manage Jobs window 56 as depicted in FIG. 8. The Create Job window 50 is used to create jobs, then leave them unassigned or assign them to vehicles. Unassigned jobs can be assigned to the vehicles at a later date or time using the Assign Job window. The Assign Job window 52 is used to assign previously unassigned jobs to vehicles, or move a job that was assigned to a vehicle to a different vehicle. The View Jobs window 54 is used to view all jobs, filter jobs by status, date, number or name, and view a detailed history of the job, including when it was created, assigned to a vehicle, read by the vehicle driver, started and completed. The Manage Jobs window 56 is used to manually change the status of a job to complete, to delete a job, or change the order of priority of jobs.

Turning first to FIG. 3, to create a job By Address with the Create Job window 50 open, the following eight steps are performed. Step One: in the Name field, enter the job name. Step Two: click the By Address tab. Step Three: enter the address in the Address, City, State/Province and Zip/Postal fields. Step Four: in the Country list, select the country. Step Five: click Check Location. Step Six: in the Description field, enter a description of the job. Step Seven: in the Assign list, select: (a) By Vehicle, then select the vehicle in the drop-down list; or (b) Unassigned, to create the job and save it to be assigned to a vehicle later. Step Eight: click Create Job. The message "Job Created with ID [number]" is then displayed and the job is sent to the vehicle selected or if unassigned, can be assigned to a vehicle at a later time. The dispatcher can then: (1) Assign the job to a vehicle using the Assign Job window 52; (2) View all jobs assigned or unassigned in the View Jobs window 54; or (3) Delete the job in the Manage Jobs window 56.

Referring next to FIG. 4, to create a job By Landmark with the Create Job window 50 open, the following eight steps are performed. Step One: in the Name field, enter the job name. Step Two: click the By Landmark tab. Step Three: select the Landmark from the list. Step Four: to search for a Landmark, enter all or part of the Landmark name in the Search field and click the Search button. Step Five: use the Next page and Previous page buttons to move through the list. Step Six: in the Description field, enter a description of the job. Step Seven: in the Assign list, select: (a) By Vehicle, then select the vehicle in the drop-down list; or (b) Unassigned, to create the job and save it to be assigned to a vehicle later. Step Eight: click Create Job. The job is then sent to the vehicle selected or if unassigned, can be assigned to a vehicle at a later time. The dispatcher can then: (1) Assign the job to a vehicle using the Assign Job window 52; (2) View all jobs assigned or unassigned in the View Jobs window 54; or (3) Delete the job in the Manage Jobs window 56.

Turning next to FIG. 5, to create a job From Map with the Create Job window 50 open, the following six steps are performed. Step One: in the Name field, enter the job name. Step Two: click the From Map tab. Step Three: select the location on the map, using the navigation and zoom arrows in the top left corner of the map to navigate to the location. Step Four: in the Description field, enter a description of the job. Step Five: in the Assign list, select: (a) By Vehicle, then select the vehicle in the drop-down list; or (b) Unassigned, to create the job and save it to be assigned to a vehicle later. Step Six: click Create Job. The job is then sent to the vehicle selected or if unassigned, can be assigned to a vehicle at a later time. The dispatcher can then: (1) Assign the job to a vehicle using the Assign Job window 52; (2) View all jobs assigned or unassigned in the View Jobs window 54; or (3) Delete the job in the Manage Jobs window 56.

Referring now to FIG. 6, use the Assign Job window 52 to assign an unassigned job to a vehicle. Thus, to carryout the foregoing task with the Assign Job window 52 open, the following six steps are performed. Step One: above the left pane 52A of the window 52, select Unassigned in order to display the list of all unassigned jobs in the left pane 52A. Step Two: above the right pane 52B of the window 52, select By Vehicle to display the list of all vehicles in the right pane 52B. Step Three: select the one of the vehicles from the list in the right pane 52B that is to be assigned the job, which causes all jobs assigned to this vehicle to be displayed in the right pane 52B, including their location, status, date and time. Step Four: from the list of all unassigned jobs in the left pane 52A, select the one job to be assigned to the selected one vehicle in the right pane 52B. Step Five: click correct the arrow between the panes 52A, 52B to enable movement of the selected job from the left pane 52A to the job list of the one selected vehicle in the right pane 52B. Step Six: click Apply, which sends the selected job to the selected vehicle.

Referring still to FIG. 6, use the Assign Job window 52 to change a job that has already been assigned to one vehicle, from that one vehicle, to a different vehicle. Thus, to carryout the foregoing task with the Assign Job window 52 open, the following seven steps are performed. Step One: above the left pane 52A of the window 52, select By Vehicle to display the list of all vehicles in the left pane 52A. Step Two: select the one of the vehicles from the list from which a job is to be removed, which causes all jobs assigned to this vehicle to be displayed in the left pane 52A, including their location, status, date and time. Step Three: above the right pane 52B of the window 52, select By Vehicle to display the list of all vehicles in the right pane 52B. Step Four: select the one of the vehicles from the list in the right pane 52B to which the job is to be moved or assigned. Step Five: in the left pane 52A, select the one job that is to be removed or re-assigned from the list of jobs of the one selected vehicle. Step Six: click the correct arrow between the panes 52A, 52B to enable movement of the selected job from the left pane 52A to the job list of the one selected vehicle in the right pane 52B. Step Seven: click Apply, which re-assigns the selected job to the new selected vehicle. It should be noted that the job can be moved back to the original vehicle before clicking Apply, but not after doing so. To "reverse" the re-assignment and return the job to the original vehicle or a different vehicle, steps one through seven must be performed again.

Turning now to FIG. 7, use the View Jobs window 54 to view all jobs and their current status and to filter jobs based on date, status, job reference number or name. Thus, to view all jobs and their current status for selected vehicles with the View Jobs window 54 open, the following three steps are performed. Step One: to view all the jobs for selected vehicles, leave all fields blank and click Filter, which causes all the jobs for the selected vehicles to be displayed. Step Two: to filter jobs select one or more of the filters: (a) select Date Created, Date Assigned, Date Modified or ETA from the Date Filter list; (b) select a status from the Job Status list; (c) enter the job reference number in the Job Ref No. field; and/or enter the job name in the Job Name field. Step Three: click Filter, which causes the jobs that meet filter criteria to be displayed.

Referring still to FIG. 7, use the open View Job window 54 also to select a job to view a detailed history of the job. Thus, to view the history of a job, right-click the job in the jobs list. The Job History pane 54A opens, displaying a detailed history of the job. The history includes when the job was created, when it was assigned to a vehicle and its current status (En Route, Arrived, Completed, etc.).

Referring finally to FIG. 8, use the Manage Jobs window 56 to manually change a job's status to completed or to delete a job. Thus, to either of the carryout the foregoing tasks with the Manage Jobs window 56 open, the following four steps are performed. Step One: in the Vehicle list, select the vehicle with job(s) whose status is to be changed. Step Two: click Refresh, causing display of the jobs assigned to this vehicle. Step Three: right-click the job to be changed, and select either Complete or Delete. The Action column changes to the status selected. Step Four: click Sync to Mobile to update the mobile device in the vehicle to reflect the changes.

Referring still to FIG. 8, use the Manage Jobs window 56 also to reorder the priority of jobs. Thus, to carryout the foregoing task with the Manage Jobs window 56 open, the following four steps are performed. Step One: in the Vehicle list, select the vehicle with jobs whose priorities are to be reordered. Step Two: click Refresh, causing display of the jobs assigned to this vehicle. Step Three: right-click the job to be move, and select either Move Up or Move Down. The job is moved either up or down in the list. Step Four: click Sync to Mobile to update the mobile device in the vehicle to reflect the changes.

Job status may be any one of the following. (1) Unassigned: the job is created but has not been assigned to a vehicle. (2) Assigned: the job is created and assigned to a vehicle. (3) Submitted: the job is processed in the system, but the job remains "submitted" until the mobile device is turned on, at which point the job becomes "received". (4) Received: the mobile device is on and receives the submitted job. (5) Read: the vehicle driver opens a new job. (6) En Route: the vehicle driver selects the job and starts navigation to the destination. (7) Arrived: the vehicle driver arrives at the destination. (8) Pending Complete: the Dispatcher marks a job as "complete" using the Manage Jobs window. (9) Completed: the vehicle driver presses "Done" on the mobile device to identify that the job is complete. (10) Pending Delete: the dispatcher selects a job and sets it to "deleted" in the Manage Jobs window. (11) Deleted: the vehicle driver deletes the job on the mobile device. (12) Failed: the job was not sent to the vehicle. The job is returned to the unassigned jobs queue.

Figure 9A:
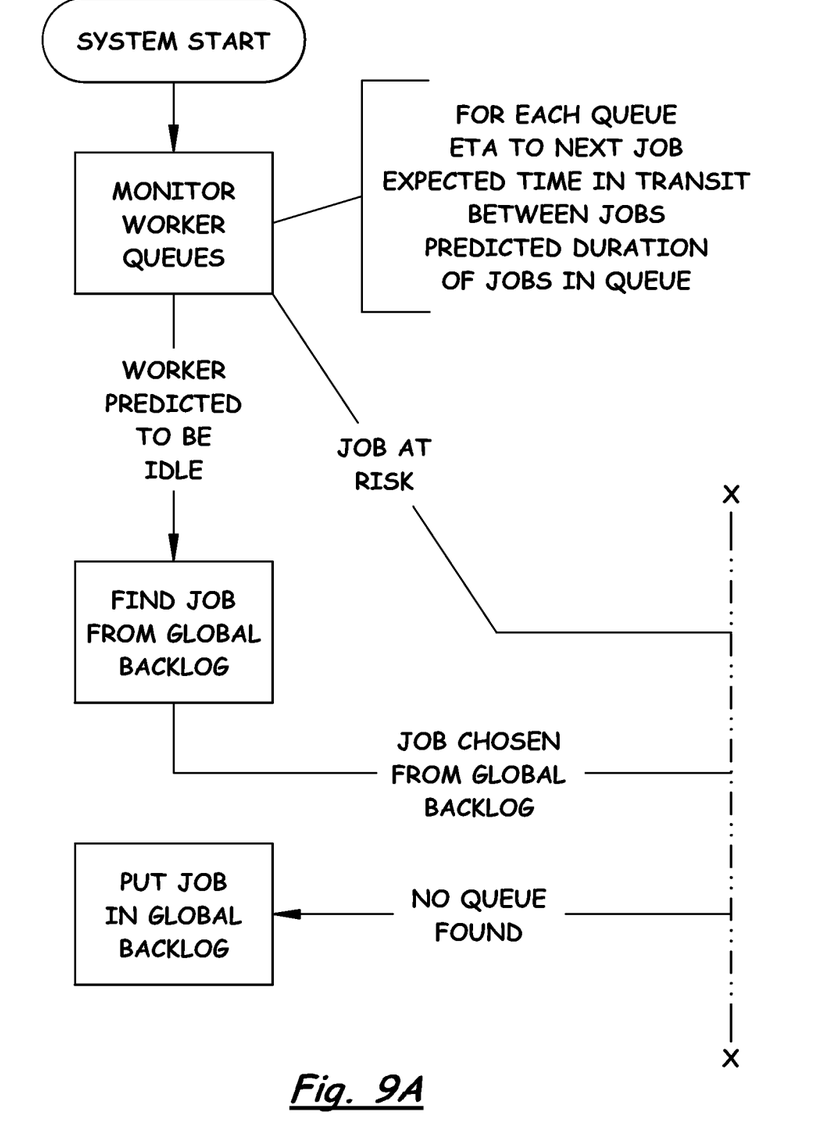
FIGS. 9A and 9B together depict a detailed flow diagram of the operations performed by the job management system and method as the dispatcher carries out the steps using the windows depicted in FIGS. 3-8.
Figure 9B:
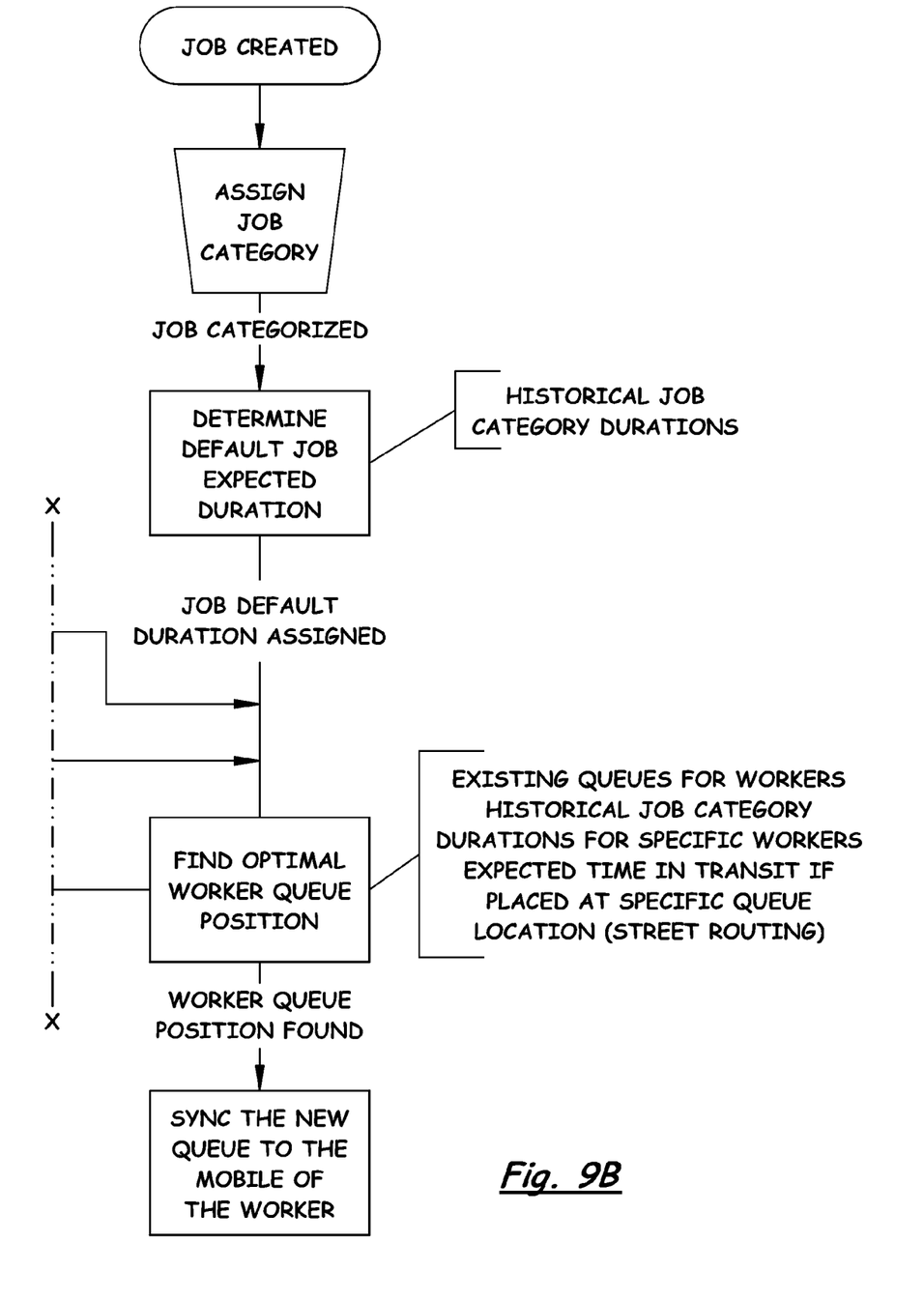

Referring to FIGS. 9A and 9B together depict a detailed flow diagram of the operations performed between the processor 12 and storage 18 in response to and concurrently as the dispatcher carries out the steps on the dispatch terminal 22 using the windows as described hereinbefore with reference to FIGS. 3-8. These operations are set forth on the flow diagram in a relatively self-explanatory manner as will be understood by one skilled in the art.

In light of the foregoing, the job management system and method of the present invention may be employed to reassign un-completed jobs to any fleet vehicles at any time in real-time, so that the fleet can be load-balanced and high-priority jobs in jeopardy of not getting completed can be reassigned. There are two types of entities: the job and its history. Both encompass a job reference number, a job owner (fleet vehicle id), a job status, and an updated time. The same job reference number can be used to identify full life cycle of job activities and history of assignment. Thus, underlying the job management system and method of the present invention are the assumptions that (1) each job has a unique id (job reference number); and (2) job deletion/assign requests are delivered by Async-based messaging system. When device is not online, the job deletion/assignment request will be stored in the message repository and will be delivery to fleet vehicle upon next logon of the device.

Furthermore, due to the nature of wireless communication itself, a mobile device may be not connected for some reason, such as due to weak signal, the device is turned off, etc., which may cause significant delay when the dispatcher decides to reassign jobs. Advantages of the present invention in this regard are that (1) the dispatcher can reassign un-completed Jobs between different fleet vehicles regardless of device state; (2) the dispatcher can track the job activities including reassignment history using a single job reference number; and (3) reassigned jobs can be updated on the mobile devices immediately or upon next device logon event.

In the description herein, embodiments disclosing specific details have been set forth in order to provide a thorough understanding of the invention, and not to provide limitation. However, it will be clear to one having skill in the art that other embodiments according to the present teachings are possible that are within the scope of the invention disclosed. All parameters, dimensions, materials, and configurations described herein are examples only and actual values of such depend on the specific embodiment.

What is claimed is:

1. A system for job management between mobile devices, comprising:
   a processor;
   a plurality of mobile devices;
   a storage coupled to said processor and storing messages and data pertaining to job assignments and reassignments at and between said mobile devices;
   a communication interface coupled to said processor and enabling communication between said processor and said mobile devices;
   a dispatch terminal coupled to said processor and adapted to send requests to said processor containing messages and data pertaining to creating and allocating job assignments and reassignments at and between said mobile devices; and
   a historical record in said storage concerning each job assignment and reassignment with respect to the mobile devices, said record comprised of said messages and data;
   wherein said processor is configured to
      store, in said storage, messages and data pertaining to job assignments and reassignments at and between said mobile devices,
      build and maintain the historical record in said storage concerning each job assignment and reassignment with respect to the mobile devices,
      receive the requests from said dispatch terminal,
      communicate via said communication interface with said mobile devices,
      execute the requests by creating and allocating the job assignments and reassignments at and between said mobile devices, and
      output to the storage the messages and data pertaining to the allocation of job assignments and reassignments to add to and maintain the historical record in said storage concerning each job assignment and reassignment with respect to said mobile devices;
   wherein said dispatch terminal is operable to display one of a plurality of windows which is used by a dispatcher to reorder priority of jobs;
   wherein said dispatch terminal is operable to display one of a plurality of windows which is used by a dispatcher to track the history of jobs using a single job reference number.

2. The system of claim 1 wherein said dispatch terminal is operable to display one of a plurality of windows which is used by a dispatcher to create jobs by sending job details to said processor.

3. The system of claim 2 wherein said dispatch terminal is operable to request said processor to leave the created job unassigned to any of said mobile devices.

4. The system of claim 1 wherein said dispatch terminal is operable to display one of a plurality of windows which is used by a dispatcher to request said processor to assign a job to one of said mobile devices.

5. The system of claim 1 wherein said dispatch terminal is operable to display one of a plurality of windows which is used by a dispatcher to request said processor to reassign a job from one to another of said mobile devices.

6. The system of claim 1 wherein said dispatch terminal is operable to display one of a plurality of windows which is used by a dispatcher to request said processor to assign an unassigned job to one of said mobile devices.

7. The system of claim 1 wherein said dispatch terminal is operable to display one of a plurality of windows which is used by a dispatcher to view the historical record of any job assigned or unassigned to any mobile device.

8. The system of claim 1 wherein said dispatch terminal is operable to display one of a plurality of windows which is used by a dispatcher to change status of a job or delete a job.

9. A method for job management between mobile devices, comprising the steps of:
   storing, in a storage, messages and data pertaining to job assignments and reassignments at and between mobile devices;
   building and maintaining a historical record in said storage concerning each job assignment and reassignment with respect to the mobile devices;
   sending by a dispatch terminal to a processor requests containing messages and data pertaining to creating and allocating job assignments and reassignments at and between mobile devices;
   receiving the requests by the processor;
   the processor communicating via a communication interface with the mobile devices;
   executing the requests by the processor therefore creating and allocating the job assignments and reassignments at and between the mobile devices; and
   outputting by the processor to the storage the messages and data pertaining to the allocation of job assignments and reassignments to add to and maintain the historical record in the storage concerning each job assignment and reassignment with respect to the mobile devices;
   wherein said sending a request includes:
      displaying one of a plurality of windows on the dispatch terminal; and
      using the one window to request the processor to reorder priority of lobs;
   wherein said sending a request includes:
      displaying one of a plurality of windows on the dispatch terminal; and
      using the one window to request the processor to track the history of jobs using a single job reference number.

10. The method of claim 9 wherein said sending a request includes:
   displaying one of a plurality of windows on the dispatch terminal;
   using the one window to request the processor to create a job; and
   sending details of the job from the dispatch terminal to the processor.

11. The method of claim 10 wherein said sending a request further includes leaving the job unassigned to one of the mobile devices.

12. The method of claim 9 wherein said sending a request includes:
   displaying one of a plurality of windows on the dispatch terminal; and
   using the one window to request the processor to assign a job to one of the mobile devices.

13. The method of claim 9 wherein said sending a request includes:
   displaying one of a plurality of windows on the dispatch terminal; and
   using the one window to request the processor to reassign a job from one mobile device to another mobile device.

14. The method of claim 9 wherein said sending a request includes:

displaying one of a plurality of windows on the dispatch terminal; and using the one window to request the processor to assign an unassigned job to one of the mobile devices.

15. The method of claim 9 wherein said sending a request includes:

displaying one of a plurality of windows on the dispatch terminal; and using the one window to request the processor to display the historical record of any job assigned or unassigned to any mobile device.

16. The method of claim 9 wherein said sending a request includes:

displaying one of a plurality of windows on the dispatch terminal; and using the one window to request the processor to change the status of a job or delete a job.

* * * * *